United States Patent
Shin

(10) Patent No.: US 8,488,005 B2
(45) Date of Patent: Jul. 16, 2013

(54) OPTICAL IMAGE STABILIZER FOR CAMERA MODULE

(75) Inventor: Doo-Sik Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 729 days.

(21) Appl. No.: 12/622,119

(22) Filed: Nov. 19, 2009

(65) Prior Publication Data

US 2010/0123788 A1    May 20, 2010

(30) Foreign Application Priority Data

Nov. 19, 2008 (KR) .......................... 10-2008-0115263

(51) Int. Cl.
*H04N 5/228* (2006.01)
(52) U.S. Cl.
USPC .............. 348/208.11; 348/208.99; 348/208.4; 348/208.7
(58) Field of Classification Search
USPC .................. 348/208.11, 208.99, 208.4, 208.7
See application file for complete search history.

(56) References Cited

U.S. PATENT DOCUMENTS

| | | | |
|---|---|---|---|
| 6,191,897 B1 * | 2/2001 | Blake et al. | 359/814 |
| 7,643,741 B2 * | 1/2010 | Sekino | 396/55 |
| 7,912,362 B2 * | 3/2011 | Lim et al. | 396/55 |
| 2005/0116138 A1 * | 6/2005 | Hanada et al. | 250/206 |
| 2006/0248715 A1 * | 11/2006 | Hanada et al. | 29/841 |
| 2008/0198462 A1 * | 8/2008 | Sekino | 359/557 |

* cited by examiner

*Primary Examiner* — Antoinette Spinks
(74) *Attorney, Agent, or Firm* — The Farrell Law Firm, P.C.

(57) ABSTRACT

Disclosed is an optical image stabilizer for a camera module using polymer elements which can be moved in a first direction and a second direction in the vicinity of the camera module. The optical image stabilizer includes an upper housing and a lower housing; a printed circuit board having an image sensor; a lens frame having a camera lens retained within the lower housing; first and second drivers disposed in the vicinity of the lens frame for moving the lens frame in first and second directions, respectively; and a movement sensing controller provided within the lower housing for sensing the amount of movement of the lens frame on the basis of the magnitude of a shaking of the camera module, so as to control the lens frame.

19 Claims, 8 Drawing Sheets

OPTICAL IMAGE STABILIZER FOR CAMERA MODULE

PRIORITY

This application claims priority under 35 U.S.C. §119(a) to an application entitled "Optical Image Stabilizer For Camera Module" filed in the Korean Industrial Property Office on Nov. 19, 2008 and assigned Serial No. 10-2008-0115263, the contents of which are hereby incorporated by reference.

BACKGROUND OF THE INVENTION

1. Field of the Invention

The present invention relates to an optical image stabilizer for a camera module capable of moving in first and second directions around a camera module using polymer elements.

2. Description of the Related Art

In general, as a large amount of still cameras and digital video cameras are widely provided, consumers increasingly want to take pictures and videos in high quality. In particular, a Complementary Metal Oxide Semiconductor (CMOS) sensor is preferred over a Charge Coupled Device (CCD) sensor as an image sensor for digital cameras. The reason is that the CCD sensor has better characteristics in image quality than the CMOS sensor, but the CMOS sensor has been increasing its market share because the CCD sensor has drawbacks of high power consumption and complicated construction thereof. Recently, however, the CMOS sensor's image quality has been improved. As image sensors such as CCD and CMOS sensors have been developed, digital cameras have become popular and widely used, and further a camera module using such image sensors is applied to a portable terminal like a cellular phone.

In the case of using a CMOS sensor, the definition of an object image is remarkably decreased due to the user shaking the camera. This shaking of the camera is commonly caused by the shaking of the hand of the user. Recently, an optical image stabilizer has been increasingly employed in order to prevent the decrease of the image definition due to external vibrations or the shaking the camera.

A typical optical image stabilizer for a camera module has two types of compensation devices: one type is designed to move an image sensor, and the other is to move a lens.

The compensation device for moving the image sensor includes a moving device which detects the movement of a mechanism by means of a plurality of angular velocity sensors and then moves the image sensor in accordance with a detected angular velocity and direction thereof, thereby compensating the object image captured on the surface of the image sensor.

In contrast, the compensation device for moving the lens includes a plurality of lenses. This device arbitrarily deflects the incident ray of light using a lens or prism which can be variably moved or deflected, or controls the input position of the image sensor, thereby removing any unstable images to provide a clear image.

However, conventional optical image stabilizers described hereinabove are disadvantageous in that the camera module includes a separate moving device near the image sensor or consists of a plurality of lenses, which causes the camera module to become large. Hence, it is difficult for conventional image stabilizers to be applied in an extremely small and complicated lens system. In addition, the camera module cannot be installed in a product such as a portable terminal which has difficulties in providing a mounting space for components therein. In order for making the optical image stabilizer of a small size to resolve the above drawbacks, the lens should be much smaller accordingly, which results in difficulties in obtaining clear images.

Further, conventional optical image stabilizers have drawbacks as it is difficult to assure their reliability against impacts due to being dropped or jarred. Therefore, an optical image stabilizer which can be applied to an extremely small and complicated lens system of a camera module is required.

SUMMARY OF THE INVENTION

Accordingly, the present invention has been made to solve at least the above-mentioned problems occurring in the prior art, and the present invention provides an optical image stabilizer capable of moving in a first and second direction around a camera module using polymer elements, wherein the optical image stabilizer can be applied to an extremely small and complicated lens system of a camera module.

Also, the present invention provides an optical image stabilizer capable of moving in a first and second direction around a camera module using polymer elements, wherein the camera module can be made to be of a small and thin size as well as reduced in cost by reducing the number of components.

Further, the present invention provides an optical image stabilizer capable of moving in a first and second direction around a camera module using polymer elements, wherein the power consumption can be decreased by compensating for a shaking of the camera by moving the lens, thereby extending the longevity of products and improving the usage thereof.

In accordance with an aspect of the present invention, there is provided an optical image stabilizer for a camera module, including an upper housing and a lower housing; a printed circuit board having an image sensor; a lens frame having a camera lens retained within the lower housing; a first driver disposed in the vicinity of the lens frame for moving the lens frame in a first direction; a second driver disposed in the vicinity of the lens frame for moving the lens frame in a second direction orthogonal to the first direction; and a movement sensing controller provided within the lower housing for sensing the amount of movement of the lens frame on the basis of the magnitude of the user's hand shake so as to control the lens frame.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
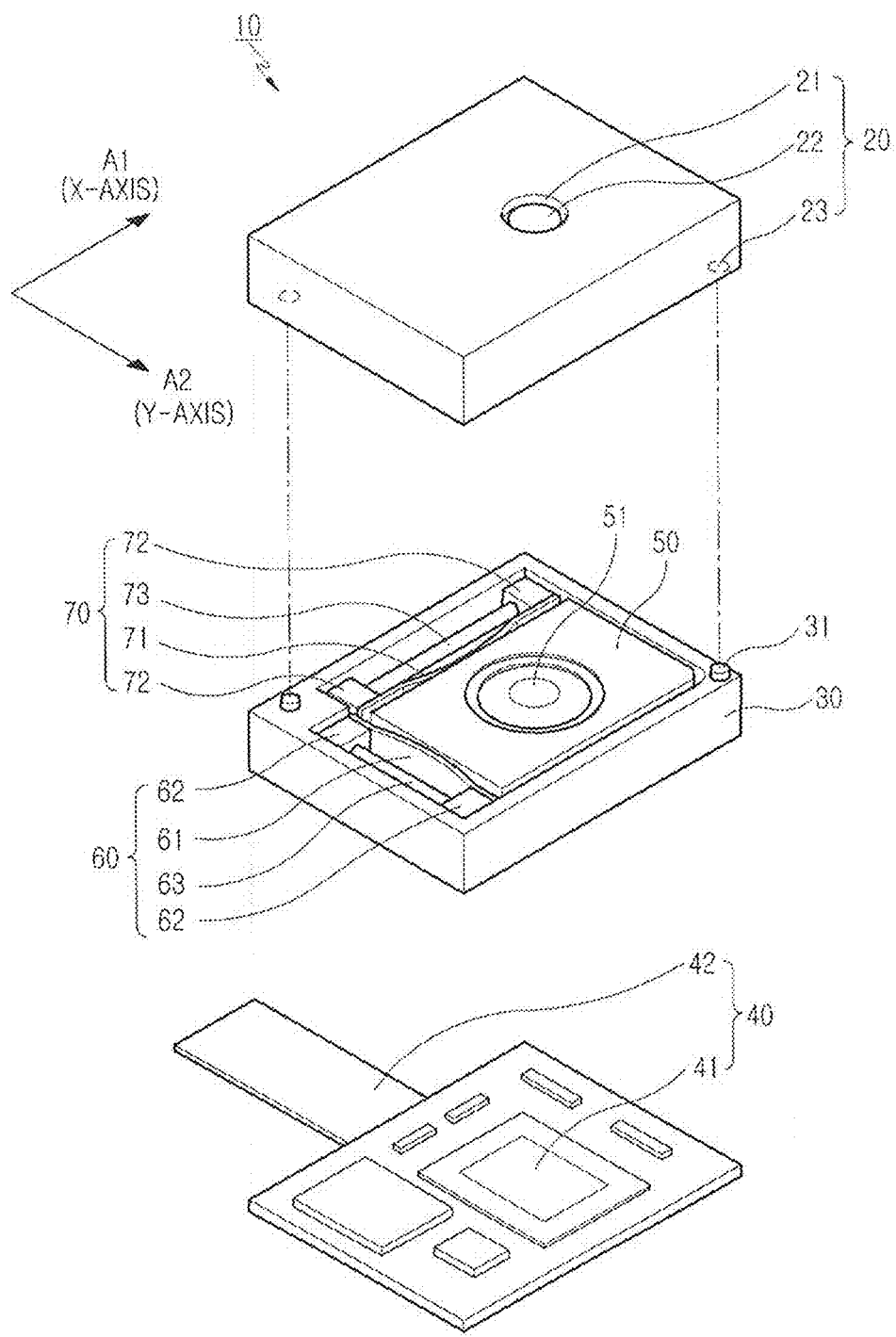
FIG. 1 is an exploded perspective view showing a camera module of an optical image stabilizer in accordance with an embodiment of the present invention.

Hereinafter, embodiments of the present invention will be described with reference to the accompanying drawings. Further, various specific definitions found in the following description are provided to help the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention unclear.

Referring to FIGS. 1 to 8, an optical image stabilizer 10 for a camera module in accordance with the present invention includes an upper housing 20 and a lower housing 30, a printed circuit board 40, a lens frame 50, a first driver 60 and a second driver 70, and a movement sensing controller 80. The upper housing 20 is joined together with the lower housing 30 preferably through an epoxy. The lower housing 30 is designed to contain the printed circuit board 40, the lens frame 50, the first and second drivers 60 and 70, and the movement sensing controller 80 therein and in cooperation with the upper housing 20. The printed circuit board 40 is engaged on the rear side of the lower housing 30 and provided with an image sensor 41 and a Flexible Printed Circuit Board (FPCB) 42. The lens frame 50 is provided with a camera lens (not shown) and capable of moving in a first (A1) direction and a second (A2) direction by means of the first and second drivers 60 and 70, respectively, within the lower housing 30. The first driver 60 is positioned in the vicinity of the lens frame 50 and coupled to the lens frame 50 for moving the lens frame 50 in the first (A1) (X-axis) direction, while the second driver 70 is positioned in the vicinity of the lens frame 50 and coupled to the lens frame 50 for moving the lens frame 50 in the second (A2) (Y-axis) direction, which is perpendicular to the first (A1) (X-axis) direction. The movement sensing controller 80 is provided within the lower housing 30 and designed to control the first and second drivers 60 and 70 by sensing the amount of the movement of the lens frame 50 on the basis of the magnitude of the shaking of the camera.

Figure 2:
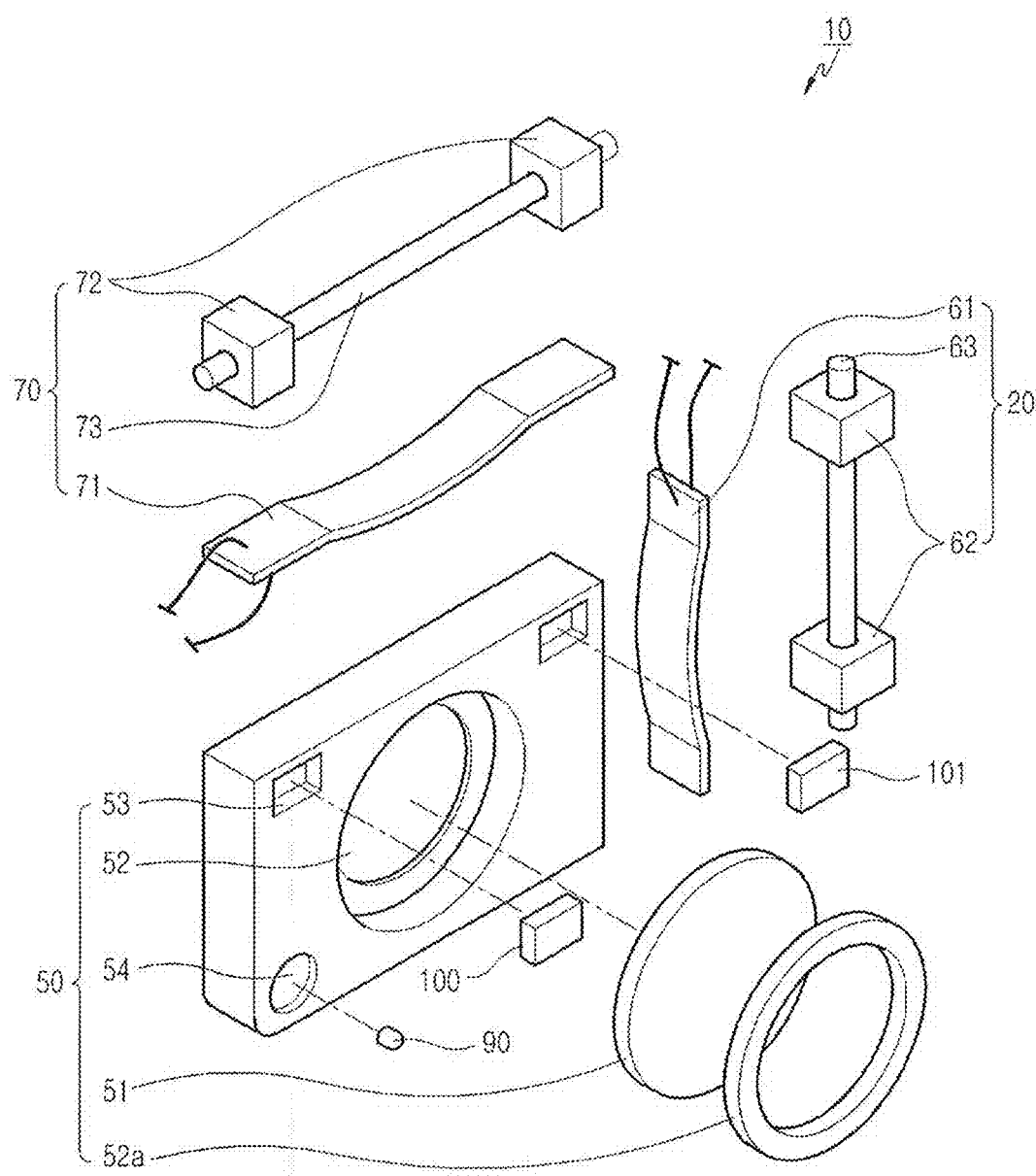
FIG. 2 is an exploded perspective view showing the constructions of the optical image stabilizer for the camera module in accordance with the embodiment or the present invention.

As shown in FIGS. 1 and 2, the upper housing 20 is provided with an opening 21, which is formed with a lens protection part 22 for blocking strange materials from entering and also protecting the lens 51. The lower housing 30 is provided with at least one boss pin 31 which can be engaged with a hole 23 formed in the upper housing 20.

Figure 3:
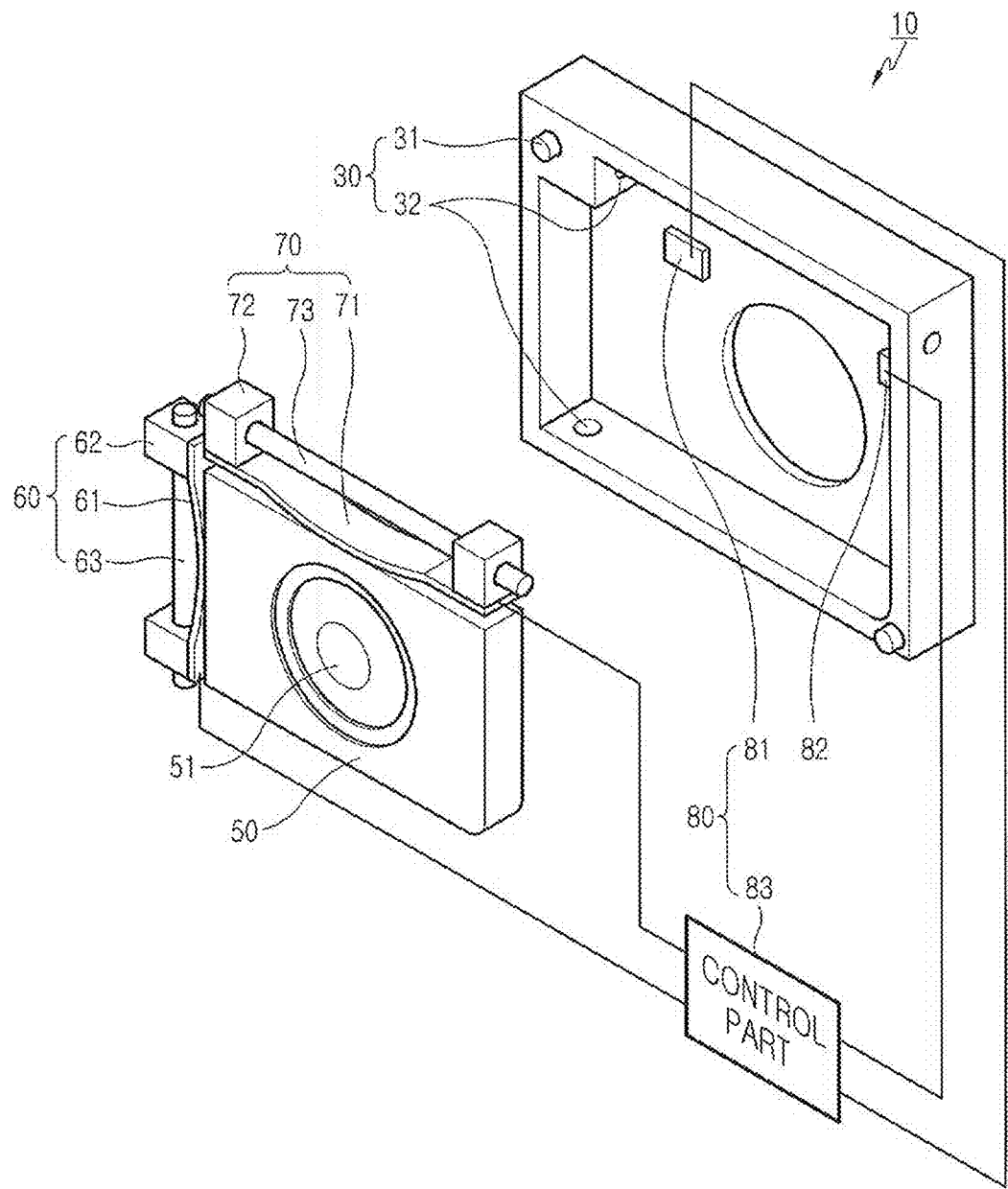
FIG. 3 is an exploded perspective view showing the unassembled state of the optical image stabilizer for the camera module in accordance with the embodiment of the present invention.
Figure 4:
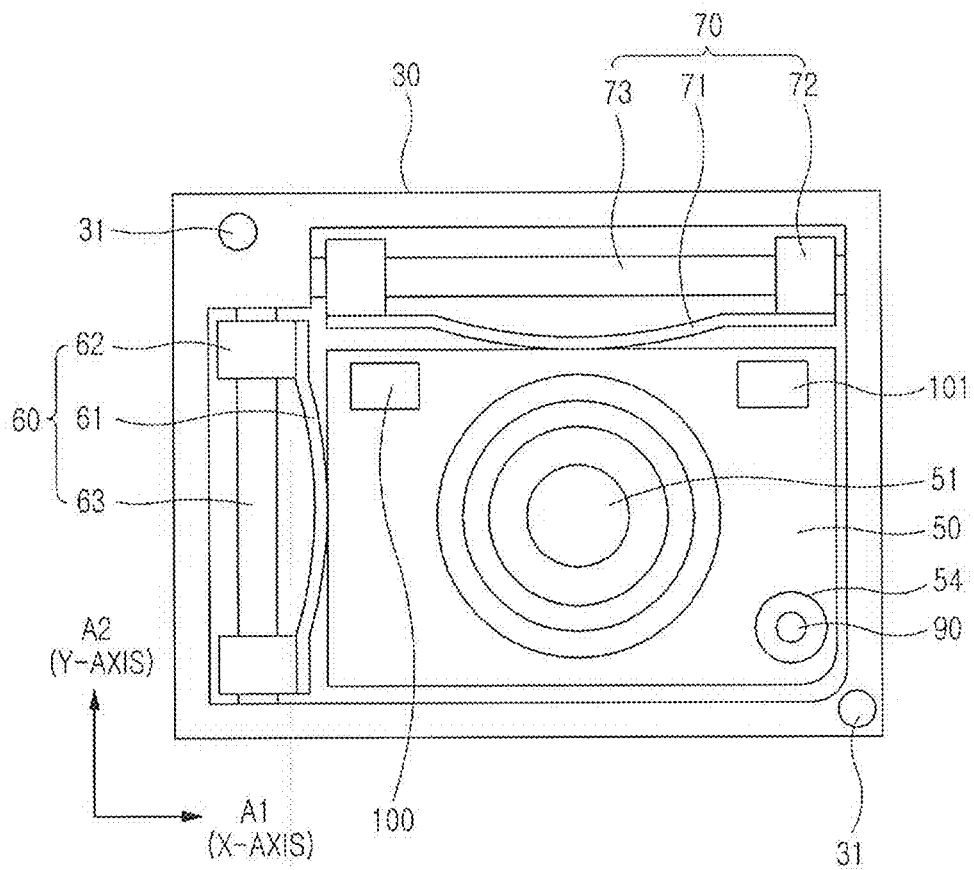
FIG. 4 is a front view showing the assembled state of the optical image stabilizer for the camera module in accordance with the embodiment of the present invention.

Referring now to FIGS. 2 and 3, the lens frame 50 includes a lens-receiving hole 52, at least two magnet grooves 53, and a bearing recess 54. The lens-receiving hole 52 is formed at the center portion of the lens frame 50 in order to accept the camera lens 51. The magnet grooves 53 are formed adjacent to the lens-receiving hole 52 and provided with first and second permanent magnets 100 and 101, respectively therein. The bearing recess 54 is positioned in the vicinity of the lens-receiving hole 52 and designed to accept a ball bearing 90.

The lens-receiving hole 52 is provided with a press-fit ring 52a which is fixedly secured to the camera lens 51, as shown in FIG. 2.

As shown in FIGS. 2 through 4 and 7, the first driver 60 includes a first drive element 61, a pair of slide parts 62, and a guide bar 63. The first drive element 61 is provided within the lower housing 30 and moves the lens frame 50 in the first (A1) (X-axis), direction through the deflection generated at the center portion of the first drive element 61 as a power source is applied to the first drive element 61. The center portion of the first drive element 61 is attached to the lens frame 50 by means of an epoxy. The pair of slide parts 62 is secured at opposite ends of the first drive element 61 and slidably movable on the guide bar 63, respectively, to create deflections at the first drive element 61. In other words, the guide bar 63 is engaged in a plurality of holes 32 formed in the lower housing 30, and further the pair of slide parts 62 is vertically slid on the guide bar 62 so as to produce deflections at the center portion of the first drive element 61.

Referring to FIGS. 2 through 4 and 8, the second drive element 71 is provided within the lower housing 30 and moves the lens frame 50 in the second (A2) (Y-axis) direction through a deflection which is generated at the center portion of the second drive element 71 as a power source is applied to the second drive element 71. The center portion of the second drive element 71 is attached to the lens frame 50, preferably with an epoxy. The pair of slide parts 72 is provided at opposite ends of the second drive element 71 and slidably movable on the guide bar 73, respectively to create deflections at the second drive element 71. In other words, the guide bar 73 is engaged in a plurality of holes 32 formed in the lower housing 30, and further the pair of slide parts 72 is horizontally slid on the guide bar 73 so as to produce deflections at the center portion of the second drive element 71.

The first and second drive elements 61 and 71 are preferably composed of polymer elements.

Figure 5:
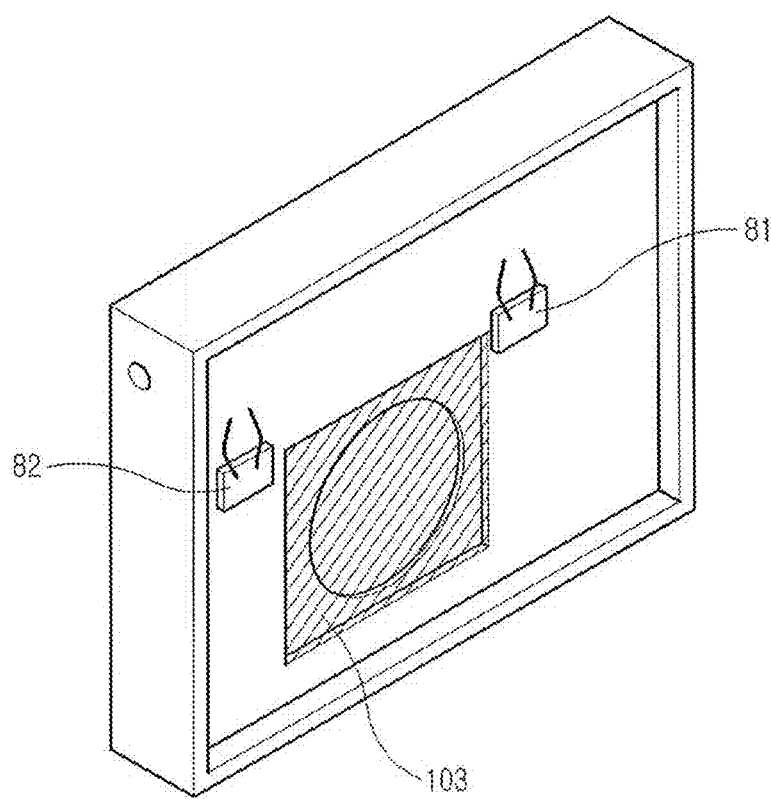
FIG. 5 is a perspective view showing the first and second hall sensors of the optical image stabilizer for the camera module in accordance with the embodiment of the present invention.
Figure 6:
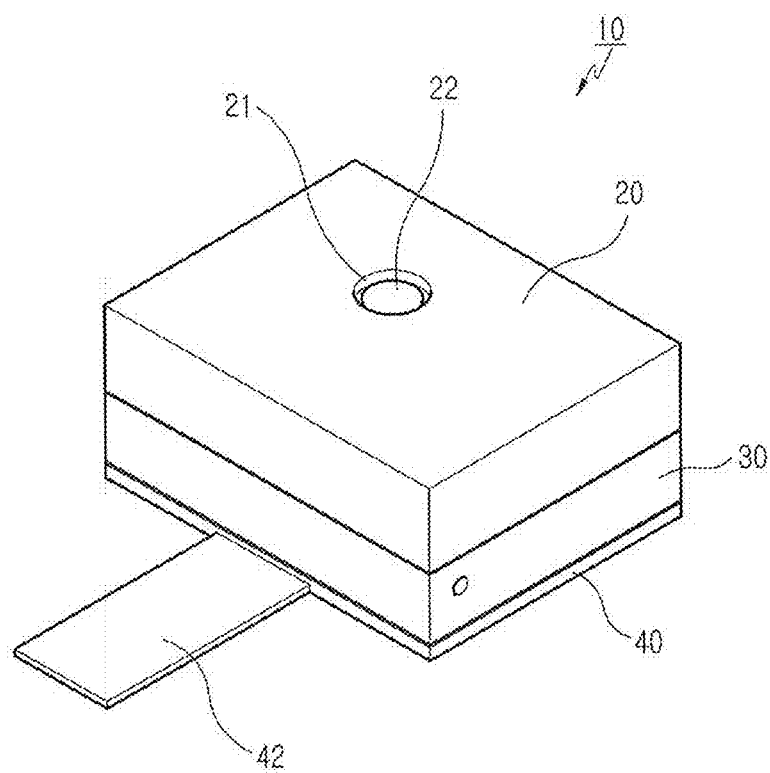
FIG. 6 is a perspective view showing the completely assembled state of the camera module of the optical image stabilizer in accordance with the embodiment of the present invention.

Referring to FIGS. 2, 3 and 5, the movement sensing controller 80 includes a first Hall position sensor 81, a second Hall position sensor 82 and a control part 83. The first Hall position sensor 81 is provided between the lens frame 50 and the lower housing 30, so as to sense the amount of movement of the lens frame 50 in the first (A1) (X-axis) direction. The second Hall position sensor 82 is provided between the lens frame 50 and the lower housing 30 so as to sense the amount of the movement of the lens frame 50 in the second (A2) (Y-axis) direction. The control part 83 is designed to control the 25 operation of the first and second drivers 60 and 70 using the signals detected by the first and second Hall position sensors 81 and 82, thereby adjusting the position of the lens frame 50.

The first and second Hall position sensors 81 and 82 are provided at the locations corresponding to the first and second permanent magnets 100 and 101, respectively, which sense the voltage change inducted in accordance with the variation of the strength of the magnetic force when the lens frame 50 is moving.

Figure 7:
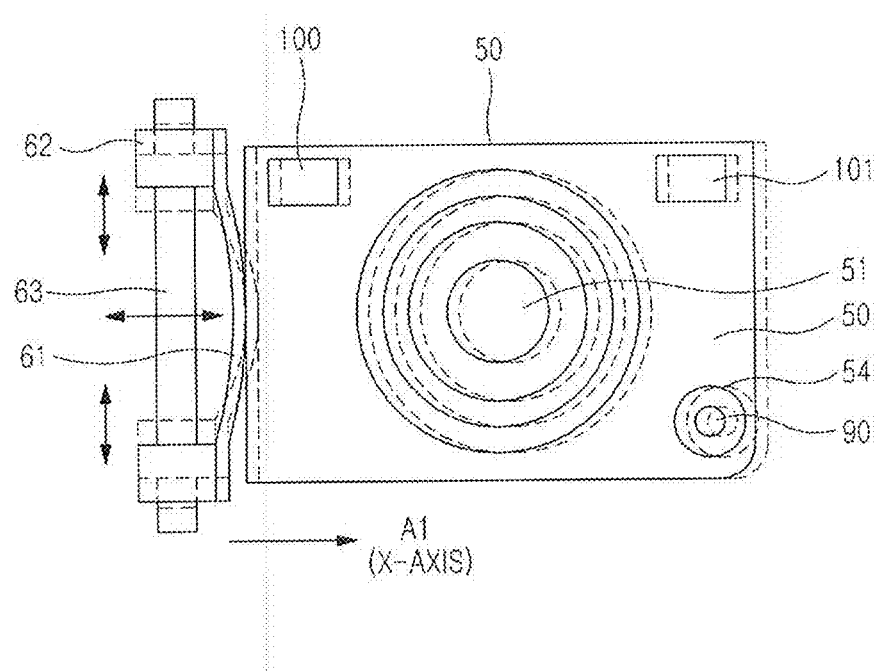
FIG. 7 is a front view illustrating the state being moved in a first (A1) direction (X-axis direction) of the optical image stabilizer for the camera module in accordance with the embodiment of the present invention.
Figure 8:
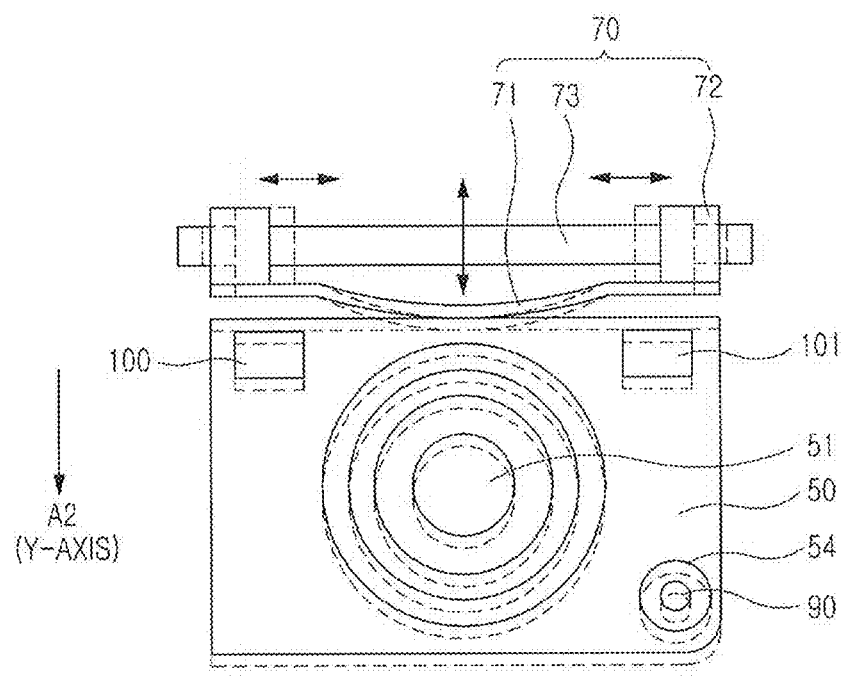
FIG. 8 is a front view illustrating the state being moved in a second (A2) direction (Y-axis direction) of the optical image stabilizer for the camera module in accordance with the embodiment of the present invention.

As shown in FIGS. 7 and 8, the bearing recess 54 is provided at the lower housing 30, which receives the ball bearing 90 in order to decrease the friction force generated when the lens frame 50 is moving.

Provided at the rear side of the upper housing 20 is an infrared filter 103, as shown in FIG. 5.

Operations of the optical image stabilizer for the camera module in accordance with the preferred embodiment of the present invention having constructions hereinabove will be described in detail hereinafter with reference to the accompanying drawings, FIGS. 1 to 8.

As shown in FIGS. 1 to 6, the optical image stabilizer 10 for a camera module includes an upper housing 20 and a lower housing 30, a printed circuit board 40 having an image sensor 41, a lens frame 50 with a camera lens 51, a first driver 60 and a second driver 70, and a movement sensing controller 80.

The pair of slide parts 62 and 72 are coupled to the first and second guide bars 63 and 73 of the first and second drivers 60 and 70, respectively, and then the first and second drive elements 61 and 71 are engaged with the pair of the slide parts 62 and 72, respectively.

The center portion of the first and second drive elements 61 and 71 are attached to the periphery of the lens frame 50 through an epoxy. Other attachment means are contemplated.

The first and second permanent magnets 100 and 101 are employed in at least two magnet grooves 53 formed in the lens frame 50.

At this state, the respective first and second guide bars 63 and 73 are then coupled to a plurality of holes 32 formed in the lower housing 30.

The first and second permanent magnets 100 and 101 are positioned at the locations facing the first and second hall position sensors 81 and 82, respectively, provided in the lower housing 30. The ball bearing 90 is provided at the bearing recess 54 formed in the lower housing 30.

At this state, the boss pin 31 formed in the lower housing 30 is engaged into the recess 23 formed in the upper housing 20, and the upper and lower housings 20 and 30 are joined together with an epoxy. Other means of attachment are contemplated.

The infrared filter 103 is attached to the rear side of the lower housing 30, and the printed circuit board 40 is engaged to the rear side of the lower housing 30 using an epoxy. Other means of attachment are contemplated.

For the purpose of compensating for the shaking of the camera, as shown in FIGS. 1 to 7, when the power source is applied to the first drive element 61, a deflection is generated at the center portion of the first drive element 61, which causes the lens frame 50 to move in the first (A1) (X-axis) direction.

In this regard, as shown in FIG. 7, the pair of slide parts 62 provided at the opposite ends of the first drive element 61 slide on the first guide bar 63 and brings the pair of slide parts 62 closer together as the center portion of the first drive element 61 is being deflected.

Meanwhile, as shown in FIGS. 1 to 6 and 8, if the power source is applied to the second drive element 71, a deflection is generated at the center portion of the second drive element 71, which causes the lens frame 50 to move in the second (A2) (Y-axis) direction.

In this regard, as shown in FIG. 8, the pair of slide parts 72 provided at the opposite ends of the second drive element 71 slide along the second guide bar 73 and brings the pair of slide parts 72 closer together as the center portion of the second drive element 71 is being deflected.

At this moment, since the first and second Hall position sensors 81 and 82 are provided at the locations facing the first and second permanent magnets 100 and 101, respectively, they sense the change of the voltage level in accordance with the strength of the magnetic forces of the permanent magnets 100 and 101 when the lens frame 50 is moving in the first or second (A1 or A2) direction. And then, the first and second Hall position sensors 81 and 82 convert those voltage changes into respective signals and transmit these signals to the control part 83.

Accordingly, the control part 83 begins to operate the first and second drivers 60 and 70 on the basis of the signals transmitted from the first and second Hall position sensors 81 and 82, thereby compensating the movement position of the lens frame 50.

The ball bearing 90 provided between the lower housing 30 and the lens frame 50 reduces the friction force created during the movement of the lens frame 50.

As described above, it is appreciated that the first and second drivers 60 and 70 are able to compensate for the shaking of the camera by moving the lens frame 50 in response to the magnitude of shaking of the camera, which assists in providing clear images.

While the invention has been shown and described with reference to certain exemplary embodiments thereof, it will be understood by those skilled in the art that various changes in form and detail may be made therein without departing from the spirit and scope of the invention as defined by the appended claims.

What is claimed is:

1. An optical image stabilizer for a camera module, comprising:
   an upper housing;
   a lower housing;
   a printed circuit board having an image sensor;
   a lens frame having a camera lens retained within the lower housing;
   a first driver disposed in the vicinity of the lens frame for moving the lens frame in a first direction through deflection;
   a second driver disposed in the vicinity of the lens frame for moving the lens frame in a second direction perpendicular to the first direction through deflection; and
   a movement sensing controller provided within the lower housing for sensing the amount of movement of the lens frame on the basis of the magnitude of a shaking of the camera module, so as to control the lens frame,
   wherein the first driver comprises:
   a first drive element, whose center portion is attached to the lens frame, for moving the lens frame in a first direction through deflection, which is generated at the center portion of the first drive element as a power source is applied to the first drive element;
   a pair of slide parts provided at opposite ends of the first drive element; and
   a first guide bar engaged to a plurality of holes in the lower housing and slidably coupled with the pair of slide parts for guidably moving the pair of slide parts to generate the deflection of the first drive element.

2. The optical image stabilizer as recited in claim 1, wherein the upper housing is provided with an opening, in which a lens protection part is formed for blocking strange materials from entering and also protecting the lens, and wherein at least one boss pin being engaged in a hole formed in the upper housing is provided at the lower housing.

3. The optical image stabilizer as recited in claim 1, wherein the lens frame comprises:
   a lens-receiving hole formed at the center portion of the lens frame for accepting the camera lens;

at least two magnet grooves formed in the vicinity of the lens-receiving hole and provided with first and second permanent magnets; and a bearing recess positioned adjacent to the lens-receiving hole for accepting a ball bearing.

4. The optical image stabilizer as recited in claim 3, wherein the lens-receiving hole is provided with a press-fit ring for fixedly securing the camera lens.

5. The optical image stabilizer as recited in claim 1, wherein the second driver comprises:

a second drive element, whose center portion is attached to the lens frame, for moving the lens frame in a second direction through a deflection which is generated at the center portion of the second drive element as a power source is applied to the second drive element;

a pair of slide parts provided at opposite ends of the second drive element, and;

a second guide bar engaged to a plurality of holes in the lower housing and slidably coupled with the pair of slide parts for guidably moving the pair of slide parts to generate the deflection of the second drive element.

6. The optical image stabilizer as recited in claim 1, wherein the first drive element is composed of a polymer element.

7. The optical image stabilizer as recited in claim 5, wherein the second drive element is composed of a polymer element.

8. The optical image stabilizer as recited in claim 1, wherein the movement sensing controller, comprises:

a first Hall position sensor and a second Hall position sensor provided between the lens frame and the lower housing for sensing the amount of the movement of the lens frame in the first and second directions, respectively; and a control part designed to control the compensation of the movement position of the lens frame by operating the first and second drivers on the basis of the signals detected by the first and second Hall position sensors.

9. The optical image stabilizer as recited in claim 8, wherein the first and second Hall position sensors are provided at locations facing the first and second permanent magnets, respectively, and wherein the first and second Hall position sensors sense the voltage changes inducted in accordance with the strength of the magnetic forces when the lens frame is moving and convert the voltage changes into signals.

10. The optical image stabilizer as recited in claim 3, wherein the bearing recess is provided at the lower housing for accepting the ball bearing in order to decrease the friction force when the lens frame is moving.

11. An optical image stabilizer for a camera module, comprising:

an upper housing;

a lower housing;

a printed circuit board having an image sensor;

a lens frame having a camera lens retained within the lower housing;

a first driver disposed in the vicinity of the lens frame for moving the lens frame in a first direction through deflection;

a second driver disposed in the vicinity of the lens frame for moving the lens frame in a second direction perpendicular to the first direction through deflection; and a movement sensing controller provided within the lower housing for sensing the amount of movement of the lens frame on the basis of the magnitude of a shaking of the camera module, so as to control the lens frame, wherein the second driver comprises:

a second drive element, whose center portion is attached to the lens frame, for moving the lens frame in a second direction through a deflection which is generated at the center portion of the second drive element as a power source is applied to the second drive element;

a pair of slide parts provided at opposite ends of the second drive element; and a second guide bar engaged to a plurality of holes in the lower housing and slidably coupled with the pair of slide parts for guidably moving the pair of slide parts to generate the deflection of the second drive element.

12. The optical image stabilizer as recited in claim 11, wherein the upper housing is provided with an opening, in which a lens protection part is formed for blocking strange materials from entering and also protecting the lens, and wherein at least one boss pin being engaged in a hole formed in the upper housing is provided at the lower housing.

13. The optical image stabilizer as recited in claim 11, wherein the lens frame comprises:

a lens-receiving hole formed at the center portion of the lens frame for accepting the camera lens;

at least two magnet grooves formed in the vicinity of the lens-receiving hole and provided with first and second permanent magnets; and a bearing recess positioned adjacent to the lens-receiving hole for accepting a ball bearing.

14. The optical image stabilizer as recited in claim 13, wherein the lens-receiving hole is provided with a press-fit ring for fixedly securing the camera lens.

15. The optical image stabilizer as recited in claim 13, wherein the bearing recess is provided at the lower housing for accepting the ball bearing in order to decrease the friction force when the lens frame is moving.

16. The optical image stabilizer as recited in claim 11, wherein the second drive element is composed of a polymer element.

17. The optical image stabilizer as recited in claim 11, wherein the movement sensing controller, comprises:

a first Hall position sensor and a second Hall position sensor provided between the lens frame and the lower housing for sensing the amount of the movement of the lens frame in the first and second directions, respectively; and a control part designed to control the compensation of the movement position of the lens frame by operating the first and second drivers on the basis of the signals detected by the first and second Hall position sensors.

18. The optical image stabilizer as recited in claim 17, wherein the first and second Hall position sensors are provided at locations facing the first and second permanent magnets, respectively, and wherein the first and second Hall position sensors sense the voltage changes inducted in accordance with the strength of the magnetic forces when the lens frame is moving and convert the voltage changes into signals.

19. An optical image stabilizer for a camera module, comprising:

an upper housing;

a lower housing;

a printed circuit board having an image sensor;

a lens frame having a camera lens retained within the lower housing;

a first driver disposed in the vicinity of the lens frame for moving the lens frame in a first direction through deflection;

a second driver disposed in the vicinity of the lens frame for moving the lens frame in a second direction perpendicular to the first direction through deflection; and a movement sensing controller provided within the lower housing for sensing the amount of movement of the lens frame on the basis of the magnitude of a shaking of the camera module, so as to control the lens frame, wherein the first driver comprises:

a first drive element, whose center portion is attached to the lens frame, for moving the lens frame in a first direction through deflection, which is generated at the center portion of the first drive element as a power source is applied to the first drive element;

a pair of slide parts provided at opposite ends of the first drive element; and a first guide bar engaged to a plurality of holes in the lower housing and slidably coupled with the pair of slide parts for guidably moving the pair of slide parts to generate the deflection of the first drive element, and wherein the second driver comprises:

a second drive element, whose center portion is attached to the lens frame, for moving the lens frame in a second direction through a deflection which is generated at the center portion of the second drive element as a power source is applied to the second drive element;

a pair of slide parts provided at opposite ends of the second drive element; and a second guide bar engaged to a plurality of holes in the lower housing and slidably coupled with the pair of slide parts for guidably moving the pair of slide parts to generate the deflection of the second drive element.

* * * * *